US007315982B2

(12) United States Patent
Becker

(10) Patent No.: US 7,315,982 B2
(45) Date of Patent: Jan. 1, 2008

(54) USER-TAILORABLE ROMANIZED CHINESE TEXT INPUT SYSTEMS AND METHODS

(75) Inventor: Joseph D. Becker, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 715 days.

(21) Appl. No.: 10/248,880

(22) Filed: Feb. 26, 2003

(65) Prior Publication Data

US 2004/0167769 A1    Aug. 26, 2004

(51) Int. Cl.
*G06F 17/20* (2006.01)
(52) U.S. Cl. .......................................... 715/535; 704/9
(58) Field of Classification Search ................. 715/535
See application file for complete search history.

(56) References Cited

U.S. PATENT DOCUMENTS

| | | | | |
|---|---|---|---|---|
| 4,124,843 A | * | 11/1978 | Bramson et al. | 345/171 |
| 4,498,143 A | * | 2/1985 | Strzelecki | 715/535 |
| 4,777,600 A | * | 10/1988 | Saito et al. | 715/535 |
| 4,855,842 A | * | 8/1989 | Hayes et al. | 386/125 |
| 4,937,745 A | * | 6/1990 | Carmon | 715/535 |
| 5,164,900 A | * | 11/1992 | Bernath | 715/535 |
| 5,175,803 A | * | 12/1992 | Yeh | 715/535 |
| 5,331,557 A | * | 7/1994 | Liu | 715/535 |
| 5,659,772 A | * | 8/1997 | Oyamada et al. | 715/535 |
| 5,933,800 A | * | 8/1999 | Zen et al. | 704/1 |
| 6,014,616 A | * | 1/2000 | Kim | 704/8 |
| 6,073,146 A | * | 6/2000 | Chen | 715/535 |
| 6,101,461 A | * | 8/2000 | Ukigawa et al. | 704/10 |
| 6,232,956 B1 | * | 5/2001 | Mailman | 345/156 |
| 6,240,170 B1 | * | 5/2001 | Shaffer et al. | 379/142.15 |
| 6,281,884 B1 | * | 8/2001 | Chang et al. | 345/171 |
| 6,282,508 B1 | * | 8/2001 | Kimura et al. | 704/10 |
| 6,292,768 B1 | * | 9/2001 | Chan | 704/1 |
| 6,349,307 B1 | * | 2/2002 | Chen | 707/103 X |
| 6,356,866 B1 | * | 3/2002 | Pratley et al. | 704/9 |
| 6,487,424 B1 | * | 11/2002 | Kraft et al. | 455/566 |
| 6,562,078 B1 | * | 5/2003 | Yang et al. | 715/535 |
| 6,594,638 B1 | * | 7/2003 | Feldman et al. | 705/14 |
| 6,598,021 B1 | * | 7/2003 | Shambaugh et al. | 704/270 |
| 6,686,852 B1 | * | 2/2004 | Guo | 341/22 |
| 6,809,725 B1 | * | 10/2004 | Zhang | 345/171 |
| 6,810,504 B2 | * | 10/2004 | Cooper et al. | 715/535 |
| 6,848,080 B1 | * | 1/2005 | Lee et al. | 715/533 |
| 6,905,340 B2 | * | 6/2005 | Stansvik | 434/322 |
| 6,925,155 B2 | * | 8/2005 | Reynolds et al. | 379/88.05 |
| 6,982,658 B2 | * | 1/2006 | Guo | 341/28 |
| 6,993,517 B2 | * | 1/2006 | Naito et al. | 707/3 |

(Continued)

OTHER PUBLICATIONS

Jordan, David K., "Transplants & Transforms: public schools & Mandarin Chinese in Taiwan", La Laguna: Universidad de la Laguna. vol. 1, pp. 333-349.*

*Primary Examiner*—Patrick N. Edouard
*Assistant Examiner*—E. Yen
(74) *Attorney, Agent, or Firm*—Oliff & Berridge, PLC

(57) ABSTRACT

Methods and systems for romanizing Chinese ideograms allow a user to create a personalized spelling dictionary that converts a user's desired roman-alphabet spelling to an equivalent Chinese character. A phonetic combination from a standard Chinese dialect is selected. The user defines a roman alphabet equivalent of the selected phonetic combination that fits the way the user pronounces the phonetic combination in the user's own dialect or idiolect.

21 Claims, 6 Drawing Sheets

U.S. PATENT DOCUMENTS

| | | | |
|---|---|---|---|
| 7,027,975 B1* | 4/2006 | Pazandak et al. | 704/9 |
| 7,076,423 B2* | 7/2006 | Boehme | 704/229 |
| 7,165,022 B2* | 1/2007 | Sugano | 704/8 |
| 2002/0055916 A1* | 5/2002 | Jost et al. | 707/1 |
| 2002/0155419 A1* | 10/2002 | Banerjee et al. | 434/322 |
| 2004/0133422 A1* | 7/2004 | Darroudi et al. | 704/220 |
| 2005/0208944 A1* | 9/2005 | Wu et al. | 704/2 |

\* cited by examiner

USER-TAILORABLE ROMANIZED CHINESE TEXT INPUT SYSTEMS AND METHODS

BACKGROUND OF THE INVENTION

1. Field of Invention

This invention relates to a user-tailorable phonetic data system.

2. Description of Related Art

Nearly all languages, even Japanese and Korean, have an accepted standard of pronunciation and an alphabetic for writing it, using dictionaries on computer (DOC). Chinese is unique in its wide range of pronunciations and lack of a tradition of phonetic script. To some extent, Mandarin serves the role of a standard, which can be represented via the modern inventions of pinyin romanization and of bopomofo phonetic alphabet. However, Mandarin still feels foreign to many Chinese-speaking people.

As a result, many computer-based Chinese character input methods, known as Input Method Editors (IME), are based on the visual shape of the characters, or even on abstract numeric codings. This gives rise to a "worse is better" situation in the market, where exceptionally inefficient, effortful methods have become extremely popular. Also, although phonetic-based Input Method Editors exist, their utility is greatly hampered by the vast variation in dialect and romanization habits among individual users.

Extensive study has been devoted to Chinese dialects and their similarities and differences. Examples of reports can be found in "Measuring Relationship Among Dialects: DOC and Related Resources", by Chin Chuan Cheng, Computational Linguistics & Chinese Language Processing 2.1:41-72, 1997 and "Quantitative Methods in Comparative Dialectology", by Xiwen Ma, Zhongguo Yuwen, 212, pp. 348-360, 1989. Also, it has been reported that, using a series of 47 pronunciation tests, a speaker's dialect can be determined.

SUMMARY OF THE INVENTION

With the advances made in the studies of Chinese dialects, phonetic methods can be more efficient and easy to use. With enough sophistication, such phonetic-based systems can provide the nearest thing to a best solution.

This invention provides systems and methods that allow a user to tailor Chinese text input based on the user's personal style.

This invention separately provides systems and methods that allow a user to customize Chinese text input based on the user's dialect.

This invention separately provides systems and methods that allow a user to customize Chinese text input base on the user's individual pronunciation or idiolect.

This invention separately provides systems and methods that allow a user to develop a portable personal roman alphabet-to-Chinese character conversion dictionary or personal spelling dictionary that reflects the user's particular style.

This invention separately provides systems and methods that allow a user to develop a portable personal roman alphabet-to-Chinese phonetic lookup table.

This invention separately provides systems and methods that allow a user to develop a portable personal roman alphabet-to-Chinese character conversion dictionary or personal spelling dictionary that is an adjunct preprocessor to an existing phonetic input system.

This invention separately provides systems and methods that allow a user to develop a portable personal roman alphabet-to-Chinese phonetic lookup table that is an adjunct preprocessor to an existing phonetic input dictionary.

This invention separately provides systems and methods for romanizing Chinese ideograms against a standard dialect.

This invention separately provides systems and methods that allow a user to develop a personal roman alphabet-to-Chinese character conversion dictionary that is portable.

This invention separately provides systems and methods that allow a user to update a previously-developed personal roman alphabet-to-Chinese character conversion dictionary.

This invention separately provides systems and methods that allow a user to download a personal roman alphabet-to-Chinese character conversion dictionary so that the user can use the personal roman alphabet-to-Chinese character conversion dictionary elsewhere, and/or to load a personal roman alphabet-to-Chinese character conversion dictionary developed elsewhere.

This invention separately provides systems and methods for determining a user's dialect.

This invention further provides systems and methods for determining the user's dialect based on a series of queries and the user's responses.

This invention additionally provides systems and methods that allow the user to customize Chinese text input based on the determined dialect.

Various exemplary embodiments of the systems and methods of this invention allow a user's dialect to be determined and/or a user's personal spelling dictionary to be developed. Various exemplary embodiments of the systems and methods of the invention may be used in any of a wide variety of devices, including, for example, personal computers. In various exemplary embodiments of the systems and methods according to this invention, a user responds to one or more queries during one or more interview sessions. In various exemplary embodiments, the queries are questions regarding specific Chinese characters and the responses are answers to the questions. In various exemplary embodiments, the queries are Chinese ideograms and the responses are the user's desired equivalent roman alphabet strings for those ideograms. In various exemplary embodiments, the user's equivalent roman alphabet strings are used to build up the user's personal spelling dictionary. In various other exemplary embodiments, the queries are questions dialects and the responses are answers to the questions.

In various exemplary embodiments of the systems and methods according to this invention, the personal spelling dictionary is portable so that the user is able to develop the personal spelling dictionary at one location, while being able to use the personal spelling dictionary at another location.

In various exemplary embodiments, the answers may then be used to determine the user's dialect. In various exemplary embodiments, the user's equivalent roman alphabet strings can be used to determine the user's dialect.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
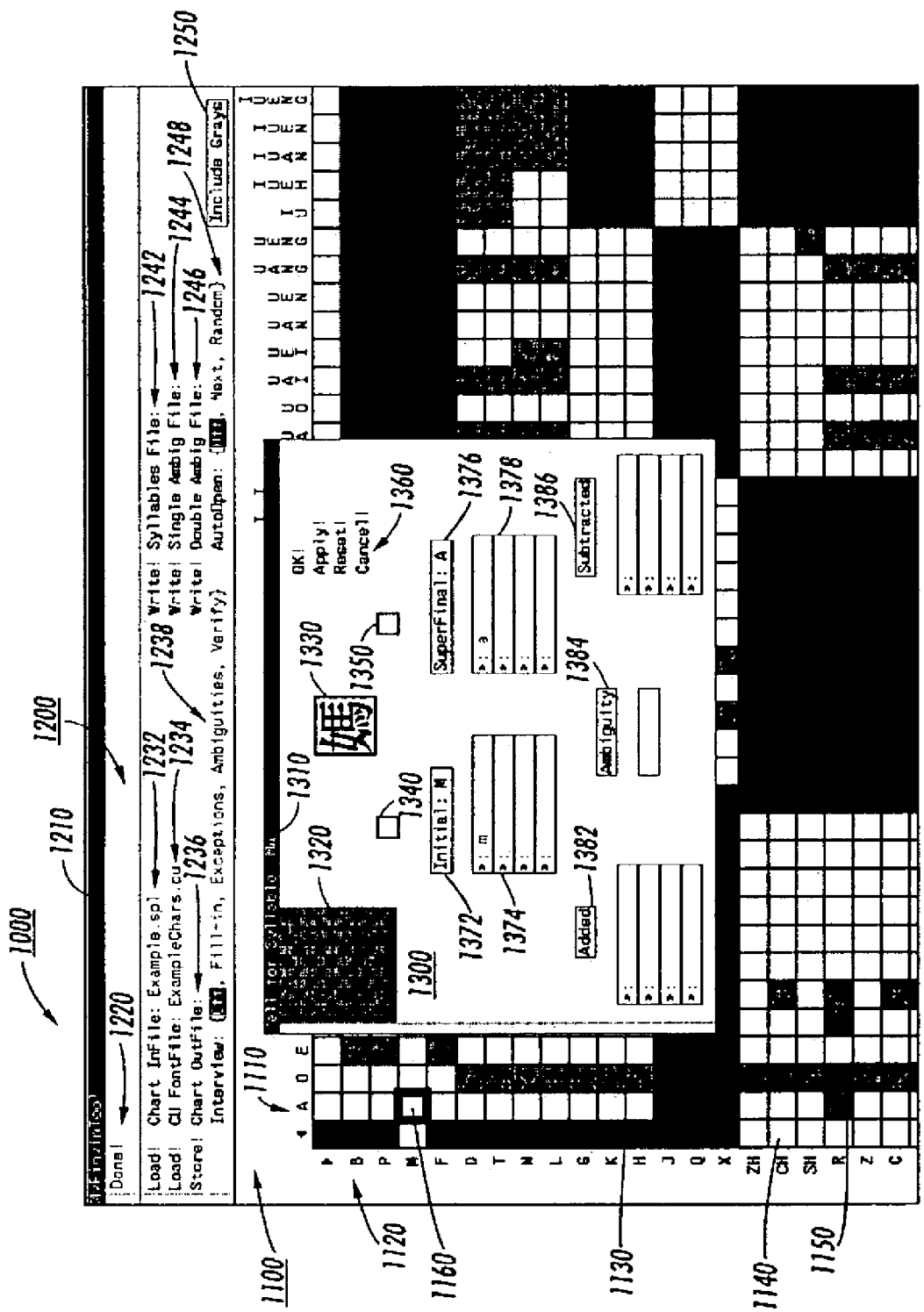
FIG. 1 illustrates one exemplary embodiment of an interview interface according to this invention for a Chinese text input system.

FIG. 1 illustrates one exemplary embodiment of an interview interface 1000 usable to create a personal spelling dictionary according to this invention. As shown in FIG. 1, the interview interface 1000 comprises a phonetic table 1100 and a status panel 1200. During an interview session, a romanization panel 1300 may also be initialized and displayed, as shown in FIG. 1.

The phonetic table 1100 contains a plurality of potential phonetic combinations. In various exemplary embodiments, a list of vowel phonemes 1110 is arranged horizontally across a top portion of the phonetic table 1100. In various exemplary embodiments, a list of consonant phonemes 1120 is arranged vertically along a left-hand-side portion of the phonetic table 1100. However, it should be appreciated that, in various other exemplary embodiments of the phonetic table 1100, the list of vowel phonemes 1110 and the list of consonant phonemes 1120 can be arranged in different ways and/or at different portions of the phonetic table 1100. The phonetic table 1100 is divided into cells, where each cell represents a phonetic combination in association with its corresponding vowel and consonant phonemes. For example, a cell 1160 is associated with the vowel phoneme "a" and the consonant phoneme "m."

In various exemplary embodiments, the list of vowel phonemes 1110 and the list of consonant phonemes 1120 are obtained from a Chinese dialect that is used as a standard. In various exemplary embodiments, this dialect is Mandarin. However, in various other exemplary embodiments, this standard dialect could be Cantonese, Fukien, or Shanghai.

The list of vowel phonemes 1110 contains vowels, transition vowels and their combinations. For example, it contains the complex phonemes and diphthongs "uo", "uang", and "ua", as well as the simple phonemes "a", "o", and "e."

The phonetic table 1100 may also contain a tone panel (not shown). The tone panel can be used to reflect the different tones and tone patterns used to pronounce Chinese words and portions of Chinese words.

In the phonetic table 1100, the cells representing the phonetic combinations can have different colors or shades to reflect the permissibility of each phonetic combination for a given dialect or for a given individual's idiolect. In the exemplary embodiment shown in FIG. 1, the cells are presented in 3 shades: black cells 1130, white cells 1140 and gray cells 1150. In this exemplary embodiment, a black cell 1130 indicates that the phonetic combination represented by the vowel and consonant phonemes associated with that cell is not permitted in the implemented dialect or idiolect, such as the standard dialect. That is, this combination of consonant and vowel phonemes is not possible and cannot occur in the implemented dialect or idiolect used to populate the phonetic table 1100. A white cell 1140 indicates that the phonetic combination represented by the vowel and consonant phonemes associated with that cell is both permissible and actually used (i.e., actually occurs) in the implemented dialect or idiolect. A gray cell 1150 indicates that the phonetic combination of the vowel and consonant phonemes associated with that cell is permissible (i.e., could occur) but does not occur in the implemented dialect or idiolect. That is, this combination is phonetically possible, but no such phonetic combination actually occurs in any word in the implemented dialect or idiolect.

Each white cell 1140 may be associated with one or more Chinese characters or ideograms, with the pronunciation determined by the vowel and consonant phonemes associated with that cell. That is, a single pronunciation may be shared by two or more characters. Also, in the phonetic table 1100 shown in FIG. 1, each white cell 1140 can be activated, such as by being selected using an input or selection device, such as a mouse, trackball or the like, to initialize a romanization session for the pronunciation of Chinese character or the syllable associated with that cell, as will be discussed in greater detail below.

In some exemplary embodiments of the phonetic table 1100 shown in FIG. 1, each gray cell 1150 may also be activated, such as by being selected using an input or selection device, such as a mouse trackball or the like, to initialize a romanization session for the pronunciation of Chinese character or the syllable associated with that cell, as will be discussed in greater detail below.

The status panel 1200 indicates the status and conditions of an interview session. A heading 1210 indicates a name of the interview interface. This name can be determined by the developer of the interview interface. It can also be customized for each user. A progress indicator 1220 indicates whether an interview or a session of an interview is in progress or is completed. The progress indicator 1220 indicates this progress by showing indicating phrases, such as "in progress" and "done".

A dialect indicator 1232 shows the dialect that is being used as the implemented dialect or idiolect and whose vowel and consonant phonemes are displayed in the phonetic table 1100. The dialect indicator indicates whether the dialect used as the standard dialect is Mandarin or some other dialect, such as Cantonese, Fukien, or Shanghai, or a idiolect. The implemented dialect or idiolect may be chosen before the interview interface 1000 is initiated. The implemented dialect or idiolect may also be selected and changed while the interview interface 1000 is active, such as by activating a dialect list or selection graphical user interface widget (not shown) and selecting a dialect from the set of listed dialects. A font indicator 1234 indicates the font used to show the phonetic data, such as the vowel and consonant phonemes in the phonetic table 1100, and/or the Chinese characters or ideograms shown in romanization panel 1200, which will be discussed in greater detail below.

An interview status indicator 1238 indicates the status of the interview displayed in the phonetic table 1100. For example, the interview status indicator 1238 indicates whether an interview session is on or off. The interview status indicator 1238 also indicates whether an interview is for "fill-in", "exceptions", "ambiguities", or "verification". Each of these types of interview sessions will be discussed in greater detail below.

A syllable file 1242 indicates the name of the file or database that stores a user's personal spelling dictionary. A syllable, i.e., a phonetic combination represented by one of the cells 1140 or 1150, defined by a user during an interview session, will be recorded in that user's personal spelling dictionary. This personal spelling dictionary is portable. Therefore, syllables defined by a user during an interview session can be used elsewhere, independent of the interview interface where the conversion between the romanization and the corresponding one or more Chinese characters were defined. For example, the personal spelling dictionary built up during an interview on one computer may be downloaded from that computer and transferred to another computer where the personal spelling dictionary can be used or updated. The transfer may be accomplished using, for example, a floppy disk, a CD-ROM, a network, or the like.

A single ambiguity file 1244 indicates the name of the file or database used to store Chinese characters with two different pronunciations. A double ambiguity file 1246 indicates the name of the file or database that stores Chinese characters with at least 3 different pronunciations. The single ambiguity file 1244 and the double ambiguity file 1246 are, in various exemplary embodiments, parts of the personal spelling dictionary and are also portable. However, in various other exemplary embodiments, the single and double ambiguity files 1244 and 1246 can be separate from the personal spelling dictionary.

An auto-open indicator 1248 indicates the status of an auto-open function. When the auto-open function is off, the interface shown in FIG. 1 is used for a user to build up a personal spelling dictionary through a series of romanization sessions, where each session is dedicated to a single phonetic combination. In the contrast, in various exemplary embodiments, when auto-open function 1248 is on, the interface shown in FIG. 1 can be used to determine a large portion of a user's personal spelling dictionary through a series of interview sessions, each for a different phonetic combination. That is, as each session is completed, a next session is automatically opened. In various exemplary embodiments, both the romanization sessions and the interview sessions can use the same interview interface, as will be discussed in greater detail below in connection with the romanization panel 1300.

In various exemplary embodiments, when the auto-open function 1248 is on, the auto-open function 1248 enables automatic interview sessions to determine the user's desired romanization for the selected syllables. The auto-open function 1248 automatically selects phonetic combinations without a user's intervention and displays the combinations, as discussed in greater detail below. In various exemplary embodiments, the user responds to each phonetic combination by entering alphabet equivalents to the consonant and vowel components, in a way discussed below. In various exemplary embodiments, the system can also be used to determine the user's dialect by analyzing the user's responses.

When the auto-open function 1248 is on, the auto-open function 1248 may work in difference modes. The auto-open function 1248 may select phonetic combinations sequentially, randomly, or logically. When the auto-open function 1248 works in a sequential mode, the "next" option indicator of the auto-open function option 1248 is highlighted. In this mode, the auto-open function 1248 selects an interview session for a phonetic combination according to where the associated vowel phoneme is in sequence of the list of vowel phonemes 1110 and where the associated consonant phoneme is in the sequence of the list of consonant phonemes 1120. When the auto-open function 1248 is in a random mode, the "random" option indicator of the auto-open indication 1248 is highlighted. In this mode, the auto-open function picks a phonetic combination for a next interview session at random.

When the auto-open function 1248 is in a logical mode, a "logical" option indicator of the auto-open indication 1248 is highlighted. In this mode, the auto-open function selects an interview session for a phonetic combination based on a predetermined logical relationship between the last cell and a next cell. For example, in various exemplary embodiments, the next cell is selected based on relationships that reflect the similarities and differences between Chinese dialects. Such a selection takes advantage of the logical relationship between the dialects to skip over, and possibly exclude, certain phonetic combinations. The skipped over phonetic combinations are those whose interview sessions are not essential or necessary for advancing the determination of the user's personal spelling dictionary. This tends to reduce computational time and thus increases efficiency.

A table status indicator 1250 indicates the status of the phonetic table 1100. The table status indicator 1250 shows whether the phonetic table 1100 explicitly shows the gray cells. For example, when the table status indicator 1250 indicates that the gray cells are to be shown, the visual appearance of those cells that represent only potential phonetic combinations is allowed to differentiate those cells from the white cells 1140 and the black cells 1130. On the other hand, when the table status indicator 1250 indicates that the gray cells are not to be shown, only white cells 1140 and black cells 1130 will appear in the phonetic table 1100. In various exemplary embodiments, the potential phonetic combinations that would otherwise be represented using the gray cells 1150 are lumped into the black cell category. It should be appreciated that, in some exemplary embodiments, one or more of the heading 1210, the progress indicator 1220, the dialect indicator 1232, the font indicator 1234, the interview status indicator 1238, the syllable file 1242, the single ambiguity file 1244, the double ambiguity file 1246 and/or the auto-open indicator 1248, and/or one or more of the options of the progress indicator 1220, the interview status indicator 1238, and/or the auto-open indicator 1248, can be omitted. Likewise, other options could be provided.

FIG. 1 also shows one exemplary embodiment of the romanization panel 1300. In various exemplary embodiments, the romanization panel 1300 appears when a romanization session is initiated. A romanization session may be initiated when a user wishes to build or update a personal spelling dictionary. In various exemplary embodiments, the personal spelling dictionary is implemented as a phonetic lookup table as a preprocessor of a phonetic dictionary. The personal spelling dictionary may be used so that the user can enter Chinese characters or text into, for example, a Chinese word processor or editor.

For a phonetic combination used in the implemented dialect or idiolect, the user romanizes the phonetic combination into a syllable in his or her personal spelling dictionary. The syllable is a roman alphabet equivalent to the phonetic combination, which may or may not have the same spelling as the standard romanized phonetic combination in the implemented dialect or idiolect. The roman alphabet equivalent is chosen by the user during a romanization session of an interview. The roman alphabet equivalent is chosen so that the roman alphabet equivalent comfortably fits the user's own dialect or in a way that conveniently matches the way the user speaks Chinese.

In various exemplary embodiments, the roman alphabet equivalent is chosen so that the roman alphabet equivalent comfortably fits the user's own idiolect in which the user speaks Chinese, without any dialect being implemented in the romanization panel and/or without determining the user's dialect. When the interface of FIG. 1 is used to generate a personal spelling dictionary, a romanization session can be initiated by a user's intervention. The user can initiate a romanization session for a specific phonetic combination by clicking on the grid in the phonetic table 1100 that represents the phonetic combination.

In various exemplary embodiments, a romanization session is initiated automatically by the auto-open function 1248. As discussed above, the auto-open function 1248 can initiate romanization sessions for a number of phonetic combinations in a sequential order according to the sequential positions of the vowel and consonant phonemes associated with those phonetic combinations. The auto-open function 1248 can also initiate romanization sessions for phonetic combinations in a random fashion, in which next a phonetic combination is randomly selected for romanization. In addition, the auto-open function 1248 can initiate romanization sessions for phonetic combinations in a logical way, in which a next phonetic combination is selected for romanization according tests that reflect the similarities and differences between romanization of archetypal Chinese characteristics and/or between Chinese dialects. In various exemplary embodiments, this may be used to determine a user's dialect, as will be discussed in greater detail below.

In various exemplary embodiments, when a romanization session is initiated, the romanization panel 1300 is displayed, as shown in FIG. 1. The romanization panel 1300 can be initialized to fill-in a syllable associated with a phonetic combination, for example, when creating or updating a personal spelling dictionary. In this case, the "fill-in" option will be indicated in the interview status indicator 1238. The romanization panel 1300 can also be initiated to verify the romanization of a phonetic combination that has previously been romanized. In this case, the "verify" option will be indicated in the interview status indicator 1238. Furthermore, the romanization panel 1300 can be initiated to update the romanization of a phonetic combination that has been romanized. This way, a user's personal spelling dictionary can be modified and changed at the user's discretion.

In various exemplary embodiments, the romanization panel 1300 includes a panel heading 1310, an information panel 1320, an ideogram panel 1330, a first point zoom widget 1340, a second point zoom widget 1350, an original consonant display box 1372, a romanized consonant display box 1374, an original vowel display box 1376, a romanized vowel display box 1378, an added synonym panel 1382, an ambiguity panel 1384, a subtracted panel 1386, and an action panel 1360. However, it should be appreciated that, in some exemplary embodiments, one or more of these elements can be omitted from the romanization panel 1300. The panel heading 1310 indicates the phonetic combination represented by a cell that is to be romanized. The ideogram panel 1330 shows the Chinese character or ideogram associated with the phonetic combination that is to be romanized.

The information panel 1320 displays information, if any, to help the user to understand the Chinese character that is displayed on the ideogram panel 1330. The content shown in information panel 1320 may be a picture, an image, a drawing, a color, or a phrase. For example, when the Chinese character in the ideogram panel 1330 is "hong" (red), the information panel 1320 may show the red color to help a user understand that "hong" is associated with the red color. Also, for example, when the Chinese character shown in ideogram panel 1330 is "nuu" (woman), the information panel 1320 may show a picture of a woman, such as, for example, the Mona Lisa, to help the user understand that "nuu" is associated with "woman."

The information panel 1320 may be associated with a database that can be progressively updated. Such a database may be updated before an interview session. The database may also be updated during an interview session, by way of an information update graphical user interface element (not shown) of the romanization panel 1300. This database does not have to have information for each and every character. Also, when there is information for a character, a user may choose different types of information related to the character, such as a picture, a phrase, or a movie clip, by selecting from an information display method graphical user interface element (not shown) of the romanization panel 1300.

The first point zoom widget 1340 and the second point zoom widget 1350 are controls used to indicate whether a roman alphabet equivalent to a phonetic combination is spelled the same as the phonetic combination itself in the implemented dialect or idiolect. When the first point zoom widget 1340 is checked, the roman alphabet equivalent to the phonetic combination associated with the Chinese character shown in ideogram panel 1330 is the same as the phonetic combination in the implemented dialect or idiolect. On the other hand, when the second point zoom widget 1350 is checked, the roman alphabet equivalent to the phonetic combination associated with the Chinese character shown in the ideogram panel 1330 is different from the phonetic combination in the implemented dialect or idiolect.

The original consonant display box 1372 shows the consonant phoneme from the consonant phoneme list 1120 of the phonetic table 1100 that is associated with the Chinese character displayed in the ideogram panel 1330. The romanized consonant display box 1374 shows the string of roman letters chosen and entered by the user as the spelling of the consonant phoneme for this Chinese character desired by the user. The user chooses this roman letter string for the consonant phoneme for the character shown in the ideogram panel 1330 based on how the user pronounces this character in the user's own dialect.

The original vowel display box 1376 indicates the vowel phoneme from the vowel phoneme list 1110 of the phonetic table 1100 that is associated with the Chinese character shown in the ideogram panel 1330. The romanized vowel display box 1378 shows the string of roman letters chosen and entered by the user as the spelling of the vowel phoneme for this Chinese character preferred by the user. The user chooses this roman letter string for the vowel phoneme according to the way the user pronounces this character in the user's own dialect.

The added synonym panel 1382 is for optional entries of synonyms of the character shown in the ideogram panel 1330. For example, when the character shown in the ideogram panel 1330 is "ma" (mother), synonyms such as "mom", "mommy", "dear mother" or "dearest mother" can be added in the added synonym panel 1382.

The ambiguity panel 1384 indicates whether there is any ambiguity associated with the pronunciation of the character shown in the ideogram panel 1330. For example, the ambiguity panel 1384 may indicate a single ambiguity if the character has two different pronunciations. The ambiguity panel 1384 may indicate a double ambiguity if the character has 3 or more different pronunciations.

The subtracted panel 1386 indicates whether the roman alphabet equivalent of the character shown in the ideogram panel 1330 is an exception of or in conflict with the roman alphabet equivalent of a group of characters that have the same phonetic combination with each other in the group, as well as with the character shown in the ideogram panel 1330, in the implemented dialect or idiolect. Usually, a character that shares the same phonetic combination with a group of other characters in the implemented dialect or idiolect also shares the same roman alphabet equivalent with that group of characters. This character would be an exception if this character does not share the same roman alphabet equivalent with the group. When this occurs, this character will be subtracted from the general roman alphabet equivalent of the group indicated in subtracted panel 1386.

For example, the characters of "mother", "question", "fiber", "horse" and "criticize" have the same phonetic combination of "ma" in Mandarin dialect. Thus, the character of "mother" may be considered to belong to a group that includes the characters for "question", "fiber", "horse" and "criticize". Usually, the roman alphabet equivalent of the character for "mother" is the same as the roman alphabet equivalent of each other character in the group. As an example, if the roman alphabet equivalent of the character for "mother" is "mu" in a user's dialect, the roman alphabet equivalents of the characters for "questions", "fiber", "horse" and "criticize" are usually also "mu" in the user's dialect.

However, if the roman alphabet equivalents for the characters for "question", "fiber", "horse" and "criticize" are all "mi" but the roman alphabet equivalent of the character for "mother" is "mu", the character for "mother" will be considered an exception to the group of characters for "question", "fiber", "horse" and "criticize". Accordingly, when the user indicates "mu" as the roman alphabet equivalent of the character for "mother" by entering "m" and "u" in the fields of romanized consonant display box 1374 and romanized vowel display box 1378, respectively, the subtract panel 1386 will show "mi" to indicate the roman alphabet equivalent of a group of characters, which shares the same phonetic combination "ma" with the character for "mother" in Mandarin dialect, and to which the character for "mother" is an exception in the user's dialect.

The action panel 1360 provides a number of function options, such as "okay", "apply", "reset", and "cancel." These options can be used by a user to, for example, confirm or clear the choices entered using the romanization panel 1300.

In one exemplary embodiment of operating the interface 1000 to create a personal spelling dictionary, the user clicks the white cell 1160 of the phonetic table 1100 associated with the vowel phoneme "a" and the consonant phoneme "m". This initiates a romanization session and causes the romanization panel 1300 for the Chinese character "mother" associated with the phonetic combination "ma" to be displayed. The phonetic combination "ma" is shown in the heading 1310. The Chinese character of "mother" is shown in the ideogram panel 1330. The information panel 1320 currently shows nothing because no picture, image, drawing, color or phrase has been established or loaded in association with this character.

In this example, as shown in FIG. 1, the original consonant display box 1372 shows the consonant string "m" and the original vowel display box 1376 shows the vowel string "a" associated with the displayed and the selected cell character. The user selects the roman alphabet consonant string and the roman alphabet vowel string associated with the displayed character according to the user's own dialect and enters these roman alphabet strings into the romanized consonant display box 1374 and the romanized vowel display box 1378, respectively.

When the entered consonant and vowel roman alphabet strings are the same as those in the implemented dialect shown in the phonetic table 1100, the first point zoom widget 1340 is manually or automatically checked to indicate that the roman alphabet equivalent to the phonetic combination is the same as the phonetic combination in the implemented dialect or idiolect. Accordingly, the second point zoom widget 1350 remains unchecked. In contrast, when one or both of the entered consonant and vowel roman alphabet strings are different from those in the implemented dialect shown in the phonetic table 1100, the first point zoom widget 1340 is automatically or manually unchecked and the second point zoom widget 1350 is automatically or manually checked.

In the example shown in FIG. 1, the user does not have any aliases for the character "mother". Accordingly, the user does not enter anything in the added synonym panel 1382. Also, for this user, the character has only one pronunciation. Accordingly, the user does not enter anything in the ambiguity panel 1384. Furthermore, for this user, this character is not an exception to a generalization of a group of characters sharing the same phonetic combination. Accordingly, the user does not enter anything in the subtracted panel 1386. The user can then choose an appropriate option in the action panel 1360 to confirm or to clear what the user has entered. When the user chooses the "ok" option, the information is recorded, the romanization session is complete and the romanization panel 1300 for this character disappears. Thereafter, the user may decide whether to romanize another phonetic combination. If the user wants to romanize another phonetic combination, the user chooses another cell of the phonetic table 1100.

After each romanization session, any changes made are saved to the files listed in the status panel 1200. In various exemplary embodiments, these files are portable. They can be downloaded by way of a floppy disk, CO-ROM or the like. They can also be transmitted by way of a network or the like.

In various exemplary embodiments, once the roman alphabet equivalent of a phonetic combination for a cell is determined, that cell is marked to indicate that phonetic combination has been romanized. In various exemplary embodiments, this is done by changing the visual appearance of the cell, such as, for example, by dimming the color and/or brightness of that cell. In this way, a user can tell from the appearance of the cells in the phonetic table 1100 which phonetic combinations have been romanized.

In various other exemplary embodiments, the phonetic table 1100 is used to display the phonetic combinations of the user's dialect, rather than the phonetic combinations of a particular implemented dialect. In this exemplary embodiment, the user may select a phonetic combination from the user's dialect shown in the phonetic table 1100, and associate it with a Chinese character that can be selected from a list.

In various exemplary embodiments, the phonetic table 1100 comprises two tables, a phonetic table corresponding to a given implemented dialect, such as a standard dialect, and a phonetic table corresponding to the user's dialect. The two phonetic tables may be arranged side by side. They may also be arranged in such a way that they are displayed one over another.

In various other exemplary embodiments of the operation of the interface 1000, where the interface 1000 is used by a dialect determining system to determine a user's dialect, the dialect determining system invokes the auto-open function 1248 to automatically select specific phonetic combinations.

FIG. 1 can thus also illustrate this use of the interface 1000. In this example, the dialect determining system has selected a phonetic combination associated with vowel phoneme "a" and the consonant phoneme "m" and is using the interface 1000 shown in FIG. 1 to display this phonetic combination. This initiates a romanization session and causes the display of the romanization panel 1300 for the Chinese character "mother" associated with the phonetic combination "ma" to be displayed. The phonetic combination "ma" is shown in the heading 1310. The Chinese character of "mother" is shown in the ideogram panel 1330. The information panel 1320 currently shows nothing because no picture, image, drawing, color or phrase has been established or loaded in association with the character.

In this example, the original consonant display box 1372 shows the consonant string "m" and the original vowel display box 1376 shows the vowel string "a" associated with the character. The user selects a roman alphabet consonant string and a roman alphabet vowel string associated with the character according to the user's own dialect and enters these roman alphabet strings into the romanized consonant display box 1374 and the romanized vowel display box 1378, respectively.

The user can then choose an appropriate option in the action panel 1360 to confirm or to clear what the user entered. When the user chooses the "ok" option, the romanization session is complete and the romanization panel 1300 disappears. Afterwards, the dialect determining system that uses the interface 1000 may decide whether to initiate another interview session for another phonetic combination. If the dialect determining system does not have enough information to determine the user's dialect, the dialect determining system will usually initiate another interview session. In contrast, if the dialect determining system has enough information to determine the user's dialect, the dialect determining system may stop the interview process.

Although the embodiment shown in FIG. 1 uses a standard dialect so that a user can choose a phonetic combination in that dialect to bring up a Chinese ideogram, in various other exemplary embodiments, a standard dialect is not required. In such exemplary embodiments, Chinese ideograms are selected and displayed by various other means, such as the visual shape of a Chinese ideogram, or the number of strokes in a Chinese ideogram.

Figure 2:
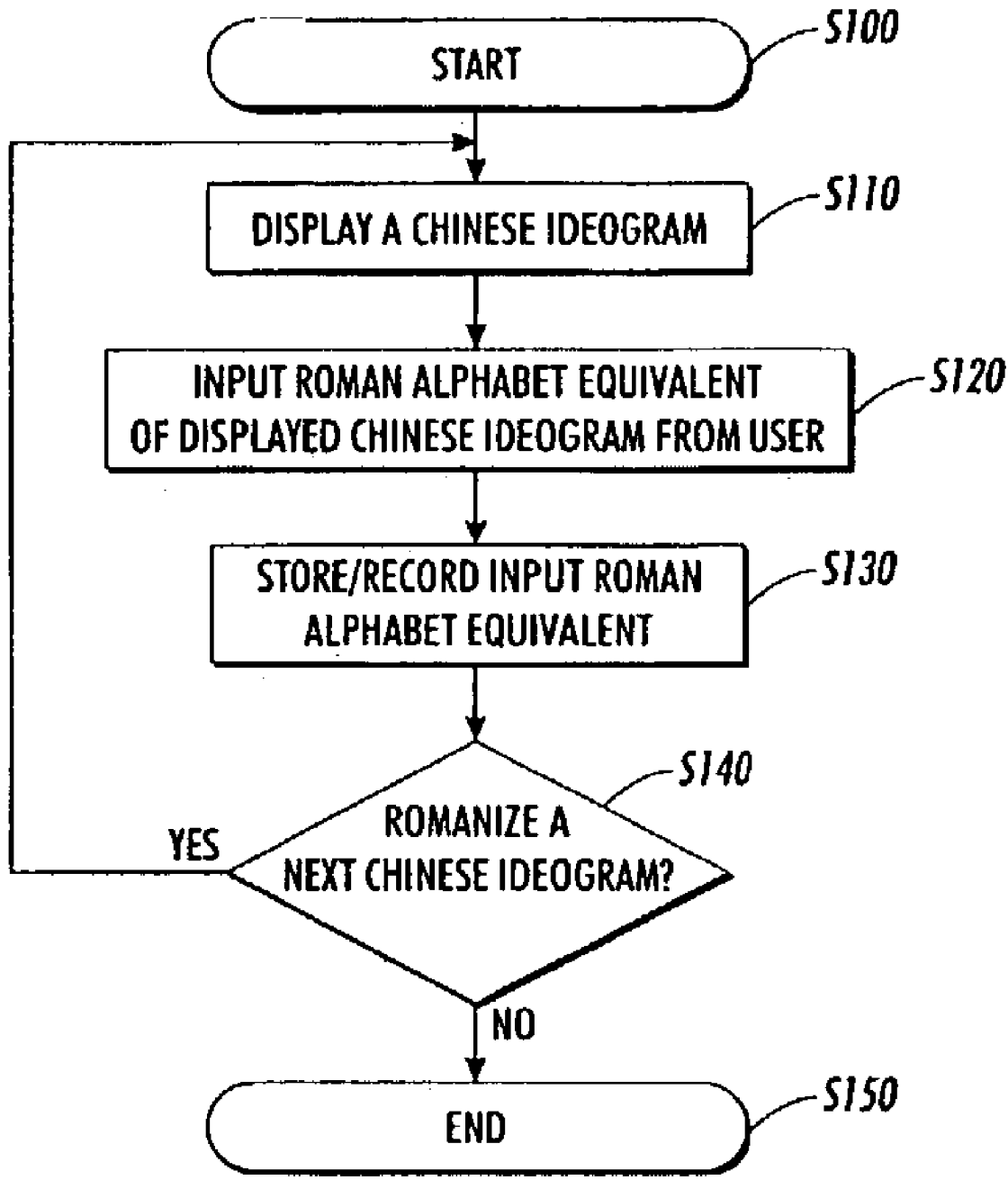
FIG. 2 is a flowchart outlining a first exemplary embodiment of a method for building up a personal spelling dictionary according to this invention.

FIG. 2 is a flowchart outlining a first exemplary embodiment of a method for building up a personal spelling dictionary according to this invention. Beginning in step S100, operation of the method continues to step S110, where a Chinese ideogram is selected and displayed. As discussed above, the Chinese ideogram may be selected based on a phonetic combination in a standard dialect, the visual shape of the Chinese ideogram, the number of strokes in the Chinese ideogram, or any other appropriate technique for selecting the Chinese ideogram. Next, in step S120, the user inputs a Roman alphabet equivalent of the displayed Chinese ideogram, based on the user's personal style or the user's individual pronunciation or dialect. Then, in step S130, the input Roman alphabet equivalent is stored. Operation then continues to step S140.

In step S140, a determination is made whether to romanize a next Chinese ideogram. If so, operation returns to step S110, where a next Chinese ideogram is selected and displayed. Otherwise, if not, operation proceeds to step S150, where operation of the method ends.

Figure 3:
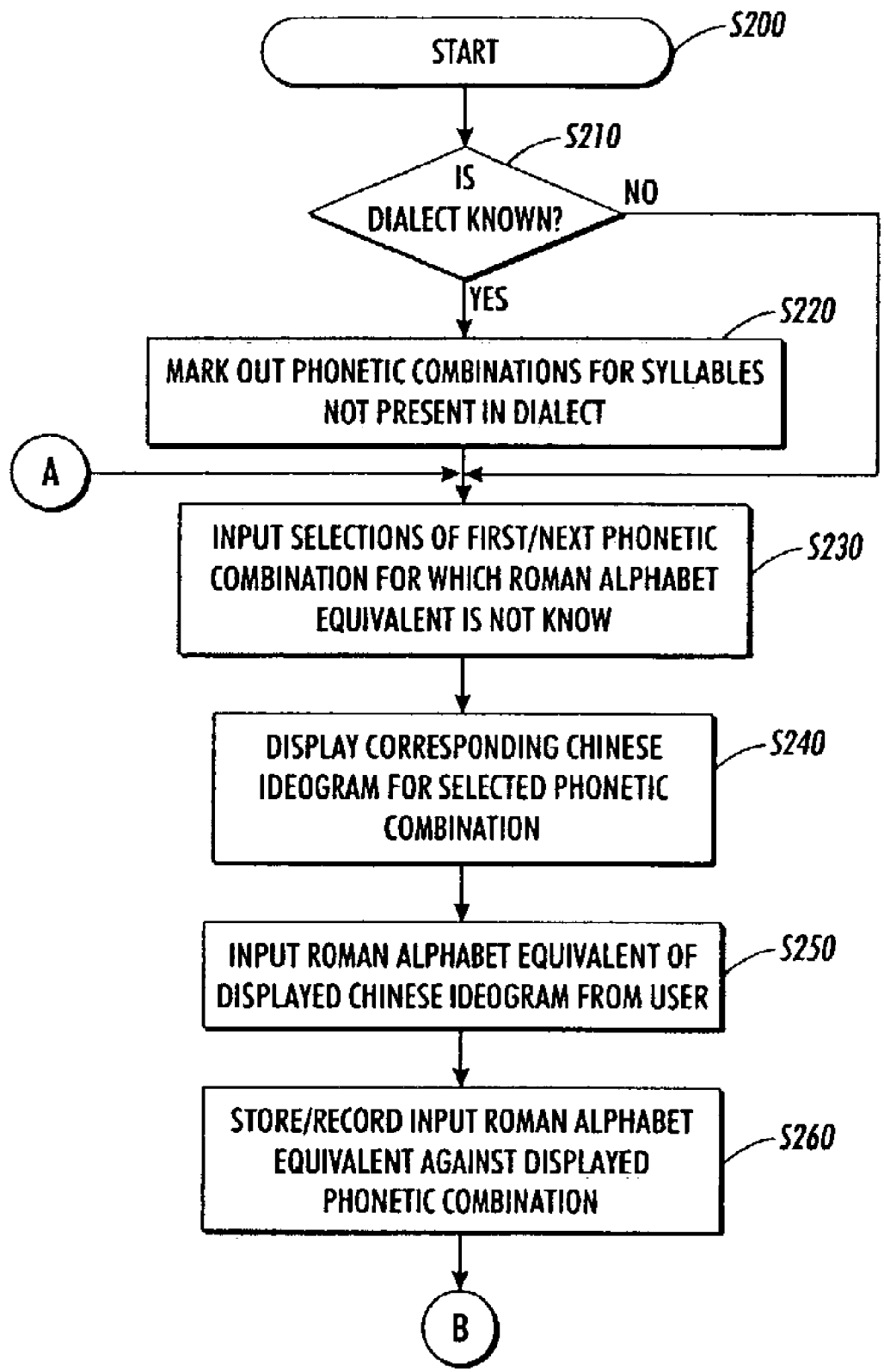
FIGS. 3 and 4 are a flowchart outlining a second exemplary embodiment of a method for building up a personal spelling dictionary according to this invention.

FIG. 3 is a flowchart outlining a second exemplary embodiment of a method for building a user's personal spelling dictionary using the interface 1000 shown in FIG. 1. In particular, in this second exemplary embodiment, various ones of the features outlined above that are missing in the first exemplary embodiment outlined in FIG. 2 are implemented. As shown in FIG. 3, beginning in step S200, operation of the method continues to step S210, where a determination is made whether a particular dialect has been identified as the implemented dialect for that user and/or this personal dictionary. If not, operation jumps directly to step S230. Otherwise, if a standard dialect is known, operation proceeds to step S220.

In step S220, those phonetic combinations for syllables not present in the implemented dialect are marked out. In the example shown in FIG. 1, the cells representing phonetic combinations not present in the implemented dialect are marked out as black cells 1130 in the phonetic table 1100. In various exemplary embodiments, phonetic combinations for syllables that are phonetically possible but not in use in the implemented dialect are marked out as gray cells 1150 in the phonetic table 1100. In other various exemplary embodiments, phonetic combinations for syllables that are phonetically possible but not in use in the standard dialect are also marked out as black cells 1130 in the phonetic table 1100. However, it should be appreciated that, in some variations of this exemplary embodiment, steps S210 and S220 are omitted. Operation then continues to step S230.

In step S230, a phonetic combination for which a roman alphabetic equivalent is not known is selected. This phonetic combination may be a first phonetic combination, if the interview session has just started. This phonetic combination can also be a subsequent phonetic combination, if selected during an interview after the beginning of the interview. In various exemplary embodiments, this phonetic combination is automatically selected. That is, in this case, in various exemplary embodiments, the phonetic combination is selected, for example, using the automatic open function 1248. In step S230, the first or next phonetic romanization session for phonetic combination can be selected in a sequential order according to the sequential positions of the vowel and the consonant associated with a phonetic combination. In step S230, the first or next phonetic combinations can be randomly selected for romanization. In addition, in step S230, the first or next phonetic combinations can be selected in a logical way, in which a phonetic combination is selected for romanization according to tests that reflect the similarities and differences between previously romanized phonetic combinations, and/or between Chinese dialects. After the first or next phonetic combination is selected, operation continues to step S240.

In step S240, a Chinese ideogram corresponding to the selected phonetic combination is displayed. An example is shown in FIG. 1, where the Chinese character/ideogram of "mother" is shown in accordance with the phonetic combination of "ma". Next, in step S250, a roman alphabet equivalent of the displayed Chinese ideogram is received from a user. The user inputs the roman alphabet equivalent according to the way the user would spell and/or pronounce the character. Then, in step S260, the roman alphabet equivalent is stored or recorded against the displayed phonetic combination. Next, in step S270, the current state of phonetic data is analyzed to determine if any other phonetic combination can be derived. Operation then continues to step S280.

In various exemplary embodiments, the analysis in step S270 can include deriving roman alphabet equivalents for similar characters from a possible general phonetic pattern among a group of characters, based on the characteristics of the implemented dialect. For example, if it can be determined from the characteristics of the implemented dialect and/or the information received from the user thus far, that the consonant "z" and the vowel "ei" in the implemented dialect are always romanized as "zh" and "ai", respectively, in the user's dialect, a generalization may be derived that all ideograms with the phonetic combination "zei" in the implemented dialect have a roman alphabet equivalent of "zhai" in the user's dialect. Also, once the phonetic combination "zei" in the implemented dialect is associated with the roman alphabet equivalent of "zhai" in the user's dialect, it may be possible to derive that the phonetic combination "shun" in the implemented dialect must be associated with the roman alphabet equivalent of "xong" in the user's dialect, based on the similarities and differences between the previously-romanized Chinese ideograms and/or between Chinese dialects. However, in various other exemplary embodiments, step S270 can be omitted.

In step S280, the roman alphabet equivalent is derived for any determined other phonetic combination. In the example discussed above in connection with step S270, if it can be determined that the consonant "z" and the vowel "ei" in the implemented dialect are always romanized as "zh" and "ai", respectively, in the user's dialect, all ideograms with phonetic combination "zei" in the implemented dialect will be automatically romanized as "zhai" in the user's dialect, without having to interview for each of the ideograms with the phonetic combination "zei" in the implemented dialect. Also, as discussed above in connection with step S270, it may be possible to derive that all ideograms with phonetic combination "shun" in the implemented dialect will be automatically romanized as "xong" in the user's dialect, without having to interview for any of the ideograms with the phonetic combination "shun" in the implemented dialect. Operation then continues to step S280.

In step S290, the derived roman alphabet equivalent for each determined other phonetic combinations is stored or recorded. Then, in step S300, a determination is made whether there are any allowable phonetic combinations in the implemented dialect for which roman alphabet equivalents have not been determined. If so, operation continues to step S310. Otherwise, operation jumps to step S320.

In step S310, a determination is made whether the user wishes to end the current interview session. If not, operation jumps back to step S230, where a next phonetic combination is selected. Otherwise, operation continues to step S320, where operation of the method ends.

Figure 4:
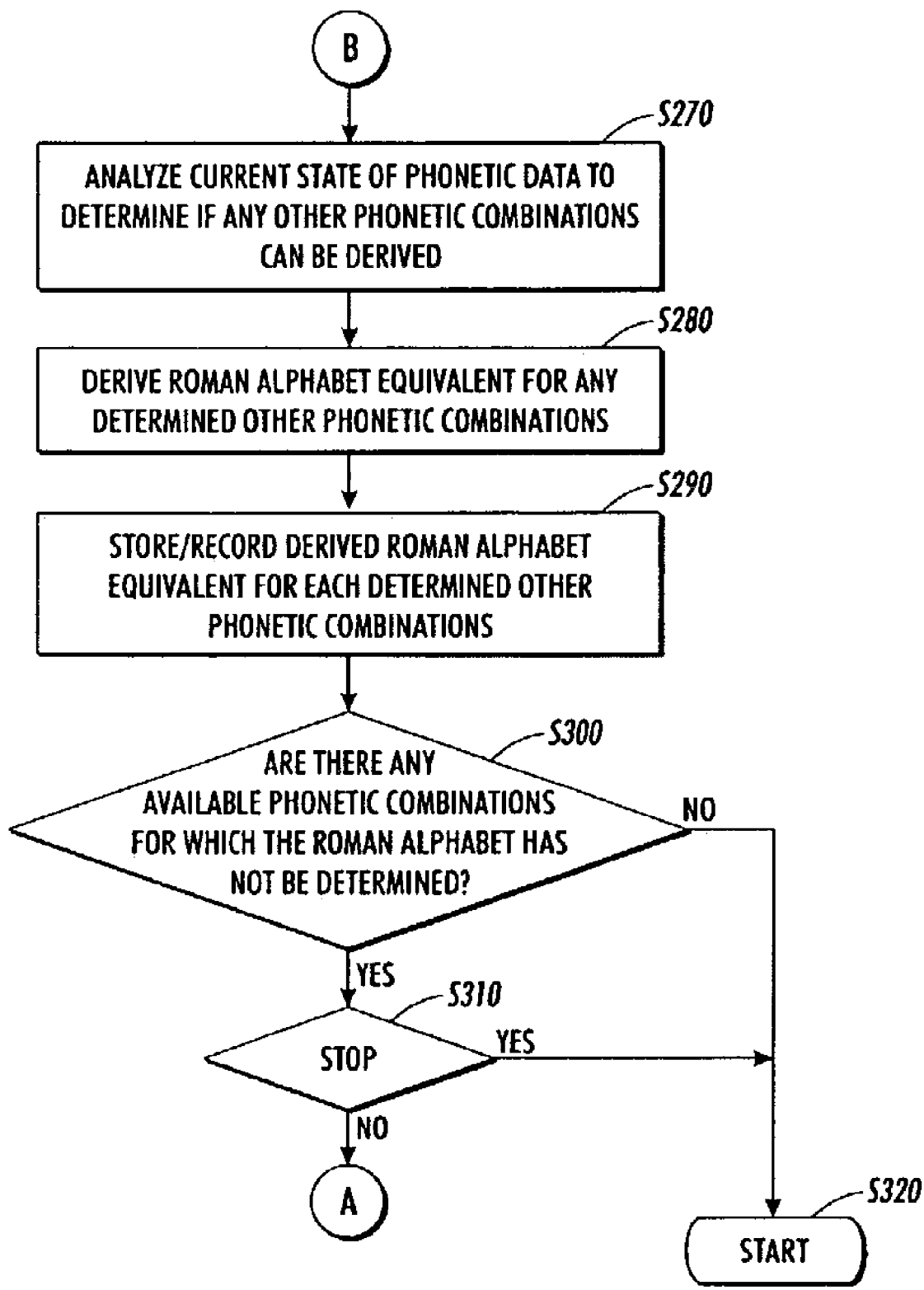

Using either of the first or second exemplary embodiments shown in FIGS. 2-4, the user may build a personal spelling dictionary to reflect the way the user speaks Chinese, which may or may not be different from the way reflected in the implemented dialect. A phonetic combination may be selected by the user. The selection may be made when a roman alphabet equivalent is not known. The selection may also be made for updates even if a roman alphabet equivalent has been defined previously by the user, or by a dialect determining session (e.g., by derivation).

In various other exemplary embodiments of user-tailorable romanized Chinese text input systems and methods according to this invention, a user may choose to initiate an interview session by directly choosing a dialect or by directly answering questions related to dialects to allow the system to determine the user's dialect.

Figure 5:
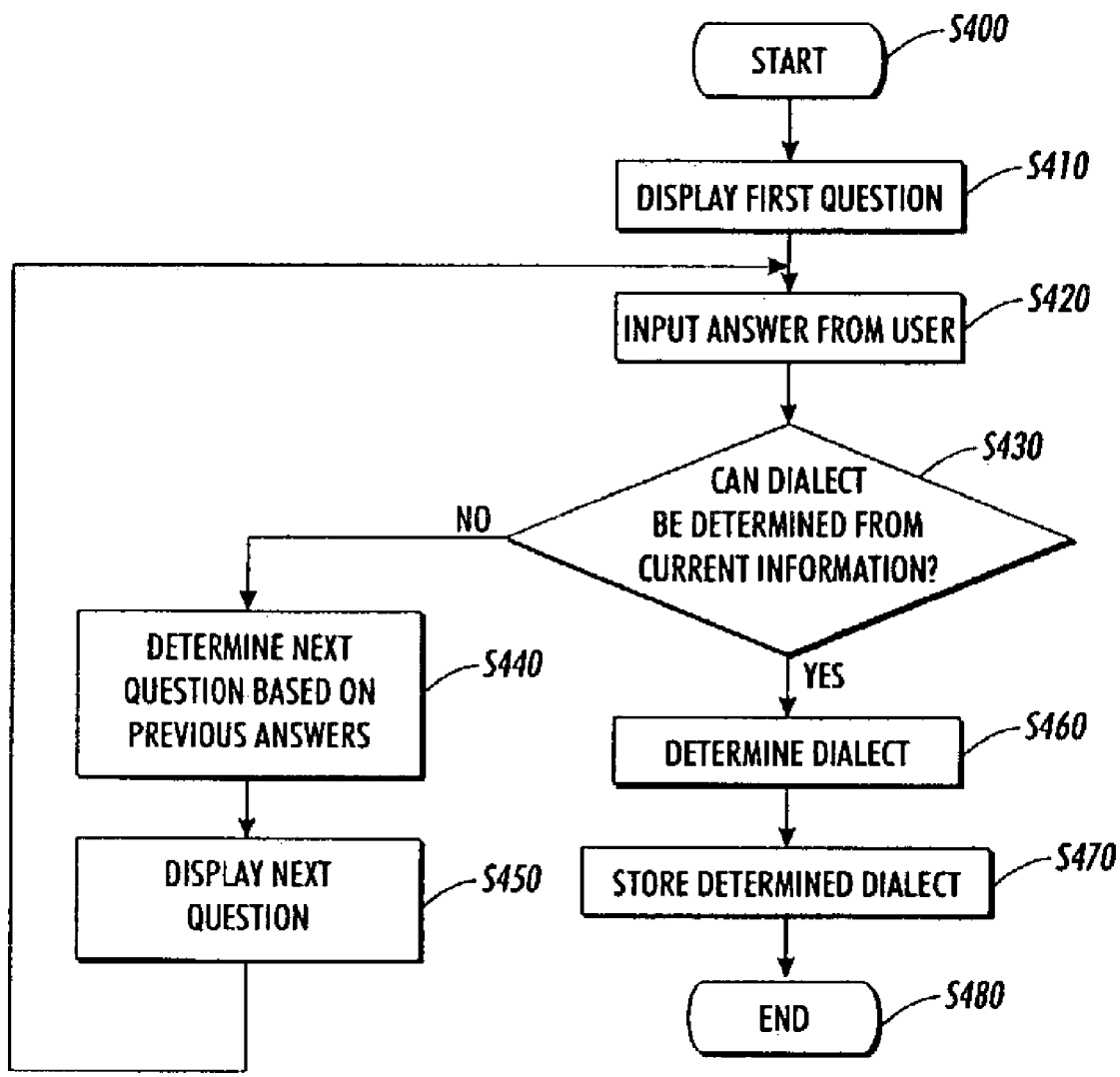
FIG. 5 is a flowchart outlining one exemplary embodiment of a method for determining a user's dialect according to this invention.

FIG. 5 is a flowchart outlining one exemplary embodiment of a method for determining a user's dialect using the romanization information provided by the user according to this invention. Beginning in step S400, operation of the method continues to step S410, where a first question is displayed to the user. Examples of this initial question can include "What is your dialect?", "What do you think your dialect is?", "Where do you live?", and "What is the dialect spoken at your home?". This initial question can also be an ideogram shown in an interface, such as the interface 1000 shown in FIG. 1. Operation then continues to step S420.

In step S420, an input in answer to the displayed question is received from the user. The answer can be selected from a list of pre-determined possible answers or can be entered by the user through a device such as a keyboard. For example, the user may type in a roman alphabet equivalent for an ideogram. Then, in step S430, a determination is made whether the user's dialect can be determined from information received thus far. If so, operation jumps to step S460. Otherwise, if not, operation proceeds to step S440.

In step S440, a next question is determined based on the previous answers received from the user. Next, in step S450, the next question determined in step S440 is displayed to the user. Operation then returns to step S420.

In determining the next question to be displayed in step S450, the relationship between the next question and the previous answers may be anywhere from remotely pertinent to closely pertinent. For example, at one extreme, in determining the next question, the previous answers can be logically used to exclude questions that have no bearing on determining the user's dialect. On the other hand, at the other extreme, the next question can be determined in a virtually random way, having little to do with the previous answers. Of course, the determination of the next question can be based on the previous answers in a way that is between the two extremes.

In step S460, the user's dialect is determined based on the responses supplied by the user to the displayed queries. Then, in step S470, the determined dialect is stored. Operation then continues to step S480, where operation of the method ends.

Figure 6:
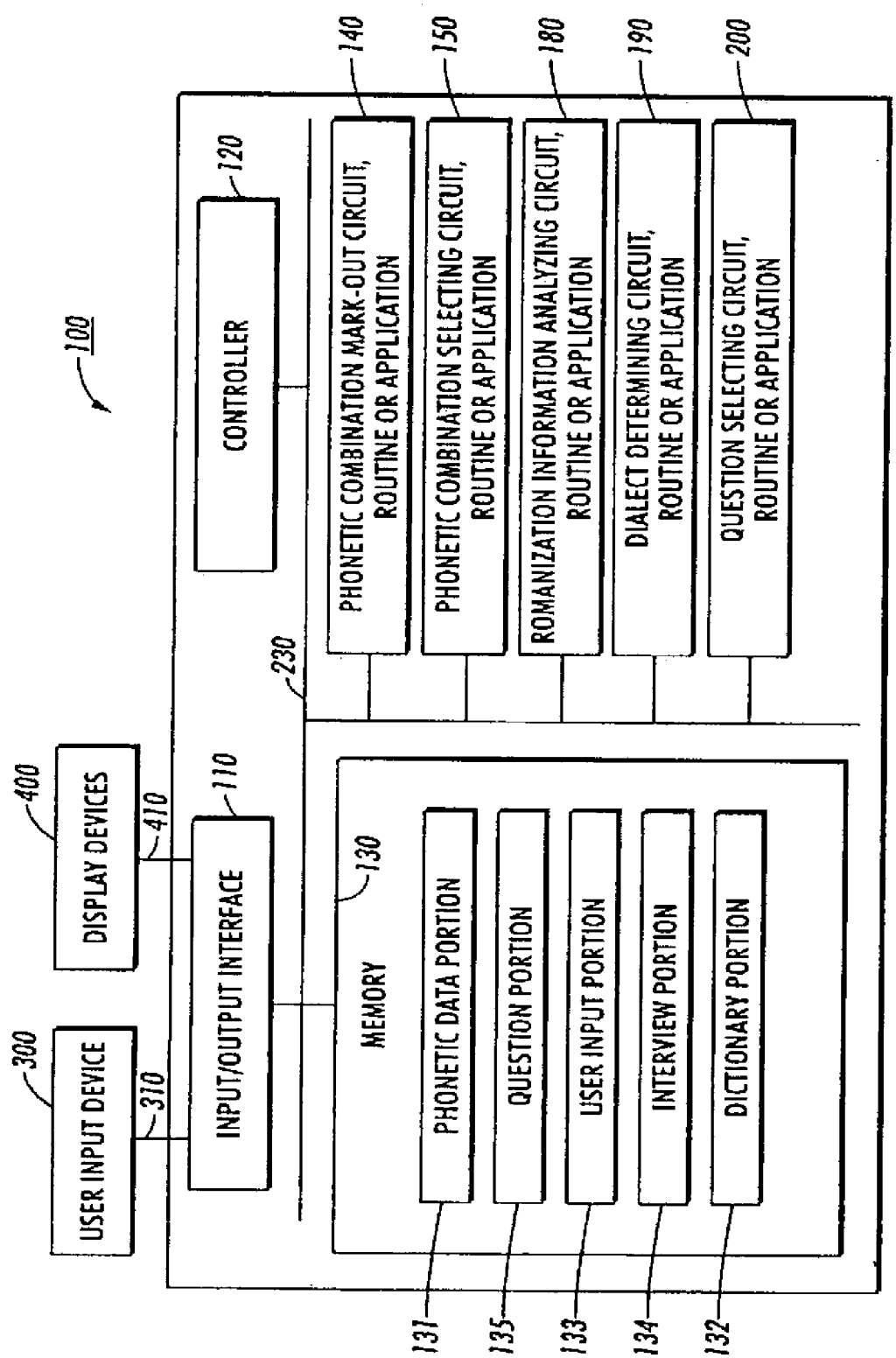
FIG. 6 is a block diagram of one exemplary embodiment of a Chinese text input system according to this invention.

FIG. 6 is a block diagram of one exemplary embodiment of a personal spelling dictionary generating system 100 according to this invention. As shown in FIG. 6, the personal spelling dictionary generating system 100 comprises an input/output interface 110, a controller 120, a memory 130, a phonetic combination mark-out circuit, routine or application 140, a phonetic combination selecting circuit, routine or application 150, a romanization information analyzing circuit, routine or application 180, a dialect determining circuit, routine or application 190, and a question selecting circuit, routine or application 200, each interconnected by one or more control and/or data busses and/or one or more application programming interfaces 230.

As shown in FIG. 6, the personal spelling dictionary generating system 100 is, in various exemplary embodiments, implemented on a programmed general-purpose computer. However, the personal spelling dictionary generating system 100 can also be implemented on a special-purpose computer, a programmed microprocessor or microcontroller and peripheral integrated circuit elements, an ASIC or other integrated circuit, a digital signal processor (DSP), a handwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 2-5, can be used to implement the personal spelling dictionary generating system 100. In various exemplary embodiments, the personal spelling dictionary generating system 100 is a pre-processor for a phonetic-based input method editor.

The input/output (I/O) interface 110 may comprise a plurality of components. The I/O interface 110 interacts with the outside of the personal spelling dictionary generating system 100. For example, the I/O interface 110 receives user input from one or more user input devices 300 over a link 310. The I/O interface 110 also outputs information to display device(s) 400 over a link 410. The one or more user input devices 300 may be a mouse, a track ball, a keyboard, a joystick, or the like. The one or more user input devices 300 may also interact with graphical user interface widgets displayed on an interactive screen. The one or more display device(s) 400 may be a display screen, an interactive screen, or the like.

As shown in FIG. 6, the memory 130 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a writeable or re-writeable optical disk and disk drive, a hard drive, flash memory, or the like. Similarly, the non-alterable or fixed memory can be implemented using any one or more of ROM, PROM, EPROM, EEPROM, an optical ROM disc, such as a CD-ROM or DVD-ROM disk, and disk drive or the like. As shown in FIG. 6, the memory 130 includes one or more of a phonetic data portion 131, which stores phonetic data of different dialects; a dictionary portion 132, which stores personal dictionaries and associated files generated and/or updated by the personal spelling dictionary generating system 100; a user input portion 133, which stores inputs from a user; an interview portion 134, which stores information of an interview session; and optionally, a question portion 135, which stores question information, which can include questions to be asked in determining a user's dialect.

In various exemplary embodiments, the various circuits, routines or applications shown in FIG. 6 are programmable or programmed circuits, routines or applications, including but not limited to computer software, executable computer code, or the like. In various exemplary embodiments of the personal spelling dictionary generating system 100 shown in FIG. 6, the phonetic combination mark-out circuit, routine or application 140 functions to mark out phonetic combinations for syllables not present in a dialect. The phonetic combination selecting circuit, routine or application 150 selects phonetic combinations for which one or more roman alphabet equivalents are to be defined. The display circuit, routine or application 160 modifies the displayed user input screens, such as the interview interface 1000 and/or the romanization panel 1300 to display on the display device 400 a Chinese ideogram corresponding to a selected phonetic combination.

The controller 120 stores into the dictionary portion 132 the romanization information input by the user using the one or more user input devices 300 and/or the displayed user input screens, such as roman alphabet equivalent information entered and/or defined by a user into the romanization panel 1300 in response to a Chinese ideogram. The romanization information analyzing circuit, routine or application 180, if implemented, analyzes the state of phonetic data to determine if any phonetic combinations can be derived, and derives and/or stores roman alphabet equivalents for any determined additional phonetic combinations. The dialect determining circuit, routine or application 190, if provided, determines whether a dialect can be determined from available information stored in the dictionary portion 132 and/or the interview portion 134. The question selecting circuit, routine or application 200, if provided, determines questions to display during an interview. The question portion 135, if provided, stores questions that the question selecting circuit, routine or application 200 selects as the question selecting circuit, routine or application 200 operates.

In various exemplary embodiments of the operation of the personal spelling dictionary generating system 100 according to this invention, a user uses the personal spelling dictionary generating system 100 shown in FIG. 6 to build up the user's personal spelling dictionary. In operation, the user interacts with the personal spelling dictionary generating system 100 via the one or more user input devices 300 and the I/O interface 110.

When the user indicates a desire to create a personal spelling dictionary or to update or increase the amount of information in the user's personal spelling dictionary, the question selecting circuit, routine or application 200, under control of the controller 120, selects or generates a question, based on the question information stored in the question portion 135, to determine an implemented dialect or idiolect. Under control of the controller 120, the question is output through the input/output interface 110 and displayed on the display device 400.

When the user inputs an answer to indicate whether an implemented dialect or idiolect is known and/or what the implemented dialect or idiolect is, the input/output interface 110 receives the user's input from the one or more user input devices 300 and, under control of the controller 120, the answer is stored in the user input portion 133. When the answer indicates that the implemented dialect or idiolect is known and what the implemented dialect or idiolect is, the controller 120 recalls the implemented dialect or idiolect stored in the phonetic data portion 131 and forwards it to the phonetic combination mark-out circuit, routine or application 140. The phonetic combination mark-out circuit, routine or application 140, under control of the controller 120, marks out phonetic combinations for syllables not present in the implemented dialect or idiolect.

Next, the phonetic combination selecting circuit, routine or application 150 interacts with the user via the one or more user input devices 300 and the I/O interface 110. For example, the user may select, using the one or more user input devices 300, a phonetic combination cell displayed on the display device 400. In response, the controller 120 forwards the user's input to the phonetic combination selecting circuit, routine or application 150, which, under control of the controller 120, displays a romanization panel 1300, including an ideogram that is associated with the selected phonetic combination, on the display device 400.

Further, the user may enter, using the one or more user input devices 300, a roman alphabet equivalent to the ideogram displayed in the romanization panel 1300 on the display device 400. In response, the controller 120 forwards the user's entry to the romanization information analyzing circuit, routine or application 150, which, under control of the controller 120, analyzes the entry and/or the state of phonetic data stored in phonetic data portion 131 to determine if any phonetic combinations can be derived. If no phonetic combinations can be derived, the romanization information analyzing circuit, routine or application 150, under control of the controller 120, stores the user's entry at the phonetic data portion 131. On the other hand, if phonetic combinations can be derived, the romanization information analyzing circuit, routine or application 150, under control of the controller 120, derives roman alphabet equivalents for any determined additional phonetic combinations. Then, the romanization information analyzing circuit, routine or application 150, under control of the controller 120, stores the derived roman alphabet equivalents for any determined additional phonetic combinations, along with the user's entry, in the phonetic data portion 131.

In another exemplary embodiment of the operation of the personal spelling dictionary generating system 100 according to this invention, a user uses the personal spelling dictionary generating system 100 shown in FIG. 6 to load and/or download the user's personal spelling dictionary. In this exemplary embodiment, the user interacts with the personal spelling dictionary generating system 100 using the one or more user input devices 300 and I/O interface 110. The controller 120 uploads to or downloads from the dictionary portion 135 the user's personal spelling dictionary.

In another exemplary embodiment of the operation of the personal spelling dictionary generating system 100 according to this invention, a user uses the personal spelling dictionary generating system 100 shown in FIG. 6 to determine the user's dialect. In this exemplary embodiment, the user interacts with the personal spelling dictionary generating system 100 using the one or more user input devices 300 and I/O interface 110.

When the user indicates a desire to determine the user's dialect, the question selecting circuit, routine or application 200, under control of the controller 120, determines a question to ask the user. The question selecting circuit, routine or application 200 retrieves the selected question from the question portion 135 and, under control of the controller 120, displays the question on the display device 400.

When the user inputs an answer, the input/output interface 110 receives the answer and, under control of the controller 120, stores the answer in the user input portion 133. Furthermore, the dialect determination circuit, routine or application 190, under control of the controller 120, determines whether the user's dialect can be determined. If the dialect determination circuit, routine or application 190 determines that the user's dialect can not be determined, the question selecting circuit, routine or application 200, under control of the controller 120, determines another question to display to the user and the process repeats. If the dialect determination circuit, routine or application 190 determines that the user's dialect can be determined, the dialect determination circuit, routine or application 190, under control of the controller 120, determines the user's dialect and instructs the interview portion 134 to record/store the determined dialect. In various exemplary embodiments, after the user's dialect is determined, operation of the personal spelling dictionary generating system 100 ends. Alternatively, after the user's dialect is determined, the user is offered the option of modifying the determination of the user's dialect before operation of the personal spelling dictionary generating system 100 ends.

In another exemplary embodiment of the operation of the personal spelling dictionary generating system 100 according to this invention, a user uses the personal spelling dictionary generating system 100 shown in FIG. 6 to determine the user's dialect by going over one or more interview sessions. In this operation, the user interacts at the user input device 300 with the personal spelling dictionary generating system 100 through the I/O interface 110. When determining the user's dialect, the question selecting circuit, routine or application 200, under control of the controller 120, displays a question to the user that allows the user's dialect or idiolect to be determined.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

What is claimed is:

1. A method of romanizing Chinese ideograms against an implemented dialect, comprising:
   receiving a user input selection of an implemented dialect from among a plurality of stored dialects;
   displaying a matrix of phonetic combinations that excludes phonetic combinations for syllables not present in the implemented dialect;
   receiving a user input of a phonetic combination selected from the display of the displayed phonetic combinations;
   defining a first roman alphabet equivalent of the selected phonetic combination;
   displaying a first Chinese ideogram, the first Chinese ideogram being associated with the selected phonetic combination in the implemented dialect;
   associating the first roman alphabet equivalent with the first Chinese ideogram;
   displaying a first question usable to discern the user's dialect;
   receiving a response from the user;
   selecting at least a second question based on the user's response to a previous question;
   displaying the at least the second question usable to discern the user's dialect;
   receiving at least a second response from the user;
   determining whether the at least the second or a subsequent response is adequate to determine the user's dialect by analyzing the at least the second response and other information, the other information including at least one prior response; and
   determining the user's dialect when the responses are adequate.

2. The method of claim 1, further comprising loading a personal spelling dictionary, the personal spelling dictionary containing one or more roman alphabet equivalents of one or more respective phonetic combinations in the implemented dialect.

3. The method of claim 1, further comprising:
   identifying a second Chinese ideogram, the second Chinese ideogram being associated with the selected phonetic combination in the implemented dialect; and
   associating the first roman alphabet equivalent with the second Chinese ideogram.

4. The method of claim 1, further comprising:
   identifying a second Chinese ideogram, the second Chinese ideogram being associated with the selected phonetic combination in the implemented dialect;
   defining a second roman alphabet equivalent of the selected phonetic combination; and
   associating the second roman alphabet equivalent with the second Chinese ideogram,
   wherein the second roman alphabet equivalent is different from the first roman alphabet equivalent.

5. The method of claim 1, further comprising storing the first roman alphabet equivalent in a personal spelling dictionary.

6. The method of claim 5, further comprising downloading the personal spelling dictionary.

7. The method of claim 5, further comprising transmitting the personal spelling dictionary.

8. The method of claim 1, wherein the other information includes information related to dialects.

9. The method of claim 1, wherein selecting the at least the second question comprises excluding at least one question from a set of predetermined questions that is not usable to discern the user's dialect based on the response from the user to at least one prior question.

10. The method of claim 1, wherein the matrix of phonetic combinations is arranged with a list of vowel phonemes on a first axis and a list of consonant phonemes on a second axis.

11. A computer storage medium having executable software code, the executable software code including instructions for a computer to perform steps of:
    selecting an implemented Chinese dialect from among a plurality of stored dialects;
    displaying a matrix of phonetic combinations that excludes phonetic combinations corresponding to syllables not present in the implemented Chinese dialect;
    selecting a phonetic combination from the display of the displayed phonetic combinations from the implemented Chinese dialect;
    displaying a user interface usable by a user to define a first roman alphabet equivalent of the selected phonetic combination;
    displaying a first Chinese ideogram, the first Chinese ideogram being associated with the selected phonetic combination in the implemented Chinese dialect;
    associating the first roman alphabet equivalent with the first Chinese ideogram;
    displaying a first question usable to discern the user's dialect;
    receiving a response from the user;
    selecting at least a second question based on the user's response to a previous question;
    displaying the at least the second question usable to discern the user's dialect;
    receiving at least a second response from the user;
    determining whether the at least the second or a subsequent response is adequate to determine the user's dialect by analyzina the at least the second response and other information, the other information including at least one prior response; and
    determining the user's dialect when the responses are adequate.

12. The computer storage medium of claim 11, wherein the executable software code further includes instructions for performing a step of receiving a personal spelling dictionary, the personal spelling dictionary containing one or more roman alphabet equivalents of one or more respective phonetic combinations in the implemented Chinese dialect.

13. The computer storage medium of claim 11, wherein the executable software code further includes instructions for performing steps of:
    identifying a second Chinese ideogram, the second Chinese ideogram associated with the selected phonetic combination in the implemented Chinese dialect; and
    associating the first roman alphabet equivalent with the second Chinese ideogram.

14. The computer storage medium of claim 11, wherein the executable software code further includes instructions for performing steps of:
    identifying a second Chinese ideogram, the second Chinese ideogram associated with the selected phonetic combination in the implemented Chinese dialect;
    defining a second roman alphabet equivalent of the selected phonetic combination; and
    associating the second roman alphabet equivalent with the second Chinese ideogram, the second roman alphabet equivalent different from the first roman alphabet equivalent.

15. The computer storage medium of claim 11, wherein the executable software code further includes instructions for performing a step of storing the first roman alphabet equivalent in a personal spelling dictionary.

16. The computer storage medium of claim 15, wherein the executable software code further includes instructions for performing a step of downloading the personal spelling dictionary.

17. The computer storage medium of claim 15, wherein the executable software code further includes instructions for performing a step of transmitting the personal spelling dictionary.

18. The computer storage medium of claim 11, wherein the matrix of phonetic combinations is arranged with a list of vowel phonemes on a first axis and a list of consonant phonemes on a second axis.

19. A system for romanizing Chinese ideograms against an implemented dialect, comprising:
    a dialect selection circuit, routine or application that selects an implemented dialect from among a plurality of stored dialects;
    a phonetic combination exclusion circuit, routine or application that excludes phonetic combinations for syllables not present in the implemented dialect;
    a display circuit that displays a matrix of phonetic combinations for syllables not excluded from the implemented dialect;
    a phonetic combination selecting circuit, routine or application that selects a phonetic combination from the display of the displayed phonetic combinations;
    a romanization information analyzing circuit, routine or application that defines a roman alphabet equivalent to the selected phonetic combination;
    a display unit that displays a Chinese ideogram, the Chinese ideogram being associated with the selected phonetic combination in the implemented dialect;
    wherein the romanization information analyzing circuit, routine or application associates the roman alphabet equivalent with the Chinese ideogram;
    displaying a first question usable to discern the user's dialect;
    receiving a response from the user;
    selecting at least a second question based on the user's response to a previous question;
    displaying the at least the second question usable to discern the user's dialect;
    receiving at least a second response from the user;
    determining whether the at least the second or a subsequent response is adequate to determine the user's dialect by analyzing the at least the second response and other information, the other information including at least one prior response; and
    determining the user's dialect when the responses are adequate.

20. The system of claim 19, further comprising a controller, the controller uploading or downloading a personal spelling dictionary, the personal spelling dictionary containing one or more roman alphabet equivalents of one or more respective phonetic combinations in the implemented dialect.

21. The system of claim 19, wherein the matrix of phonetic combinations is arranged with a list of vowel phonemes on a first axis and a list of consonant phonemes on a second axis.

* * * * *